United States Patent Office 3,016,399
Patented Jan. 9, 1962

---

3,016,399
CHOLINPHOSPHORIC ACID SALTS AND PRODUCTION THEREOF
Andre Debay, Paris, France, assignor to Societe Francaise de Recherches Biochimiques H. Besson & Cie, Paris, France, a company of France
No Drawing. Filed May 27, 1959, Ser. No. 816,068
1 Claim. (Cl. 260—461)

A number of metal salts of phosphoric acid mono-esterified by cholin chloride or metal cholinphosphate chlorides, particularly calcium and barium salts corresponding to the formula

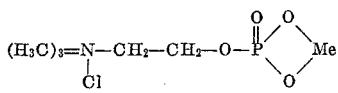

where Me denotes Ca or Ba, are already known.

The calcium salt is employed for therapeutic purposes, particularly by reason of the lipotropic activity thereof and chiefly as a phosphocalcic medicine.

It is an object of my invention to provide new metal derivatives, particularly new metal salts, of cholinphosphoric acid, that is to say compounds which do not contain chlorine and have a betain structure, such compounds being useful for therapeutic purposes.

Another object is to provide a relatively simple process for making said compounds.

Further and more specific objects will become apparent as the specification proceeds.

According to this invention, I provide new metal cholinphosphates which may be represented by either one of the formulas

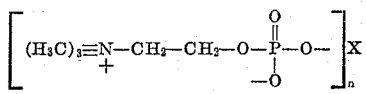

or

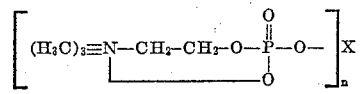

where X stands for a cation, particularly a metal and $n$ stands for the valency of X; the second formula will be adopted in the following specification and claims for the sake of convenience.

It is known that cholinphosphoric acid may be produced in phosphoric acid solution by phosphorylating cholin chloride by means of a mixture of phosphoric acid and excess phosphorus pentoxide under a reduced pressure which is effective to cause elimination of hydrogen chloride produced at the expense of cholin chloride.

Nevertheless, chlorine is not mobile enough to be removed thoroughly from the product of a phosphorylation thus carried out, and besides cholinphosphoric acid having a betain structure and being a weak acid, there remains both phosphoric acid, by reason of the excess of phosphorus pentoxide employed for phosphorylating, and chlorocholinphosphoric acid which is a stronger diacid.

Where it is attempted to produce salts from that acid mixture, one fails to convert cholinphosphoric acid having a betain structure to a salt thereof if a weak base or a salt of a weak base is employed as a reactant; if a strong base or a salt from a strong base and a weak acid such as carbonic acid is employed, it is difficult to isolate the metal cholinphosphate having a betain structure where said cholinphosphate is water soluble.

I have now found that it is possible to obtain an isolable cholinphosphate having a betain structure from an aqueous solution of cholinphosphoric acid provided an oxide having a definitely alkaline reaction in aqueous medium is added gradually to the aqueous cholinphosphoric acid solution until the pH-value is not less than 8.5, said oxide being that of a metal whose tertiary phosphate is insoluble or little soluble in water.

After removing the phosphate which has precipitated, it is only necessary to allow or cause the desired cholinphosphate to crystallize from the aqueous solution.

The starting aqueous solution of cholinphosphoric acid may be obtained by setting that acid free from an aqueous solution of a salt thereof by means of an acid yielding a water insoluble salt, for example sulphuric acid in the case of calcium cholinphosphate, then removing the precipitated salt (for example calcium sulphate).

From a practical standpoint it is more economic to start from a concentrated aqueous solution as obtained by phosphorylating cholinchloride with excess phosphoric acid under a reduced pressure then diluting the solution thus formed with water, for example 5 or 6 times its volume of water.

The oxide to be employed for carrying out the process of my invention is preferably in the form of the corresponding hydroxide and may be more particularly that of magnesium or an alkali-earth metal, especially calcium or barium. The oxide or hydroxide is added very gradually by small portions to the acid solution with a view to avoiding any heating that would be detrimental to the stability of the cholinphosphoric ester.

For practical purposes I prefer to stop addition of hydroxide when the mixture has become almost neutral (pH 6.5–6.7). At that time it is very easy to separate the phosphate precipitate produced through salification of free phosphoric acid. The filtrate which contains the already partly neutralised ester is then alkalinized to a pH of 8.5–8.7 by means of a further amount of hydroxide. On the contrary a direct alkalinization without intermediate filtering at a pH value of 6.5–6.7 results frequently in the production of a colloidal phosphate precipitate which it is very difficult to filter off and wash.

Although carbonates may be employed as neutralizing agents the use thereof is not desirable. They do not avoid the need of employing hydroxides which used alone enable a suitable pH-value in the alkaline range to be reached. On the other hand, carbonates cause a big evolution of carbon dioxide which saturates the solution and disturbs the measurements of pH-values. Where the magnesium salt is to be produced, basic magnesium carbonate may indeed be employed as a neutralizing and alkalinizing agent, but I found that the use thereof results in the production of a non-negligible amount of a magnesium cholinphosphate carbonate to which the following formula is ascribable:

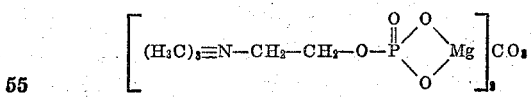

Such a salt which does not have the betain form must be separated subsequently from the desired magnesium cholinphosphate and for that purpose a supplemental, fairly difficult manipulation is required.

The process may be effected simply under atmospheric conditions of temperature and pressure.

With a view to checking that the desired pH-value has been reached, it is only necessary to add the hydroxide until phenolphthalein shows a colour change to pink in samples taken from time to time.

For the purpose of causing the desired cholinphosphate to crystallize out, an insolubilizing agent, specifically ethanol, may be added, the cholinphosphate being soluble in water and in absolute ethanol but slightly soluble in mixtures thereof. If necessary, acetone in which the cholinphosphate is insoluble may also be employed.

My invention further comprises the production of cholinphosphates of metals (such as sodium and potassium) to which correspond a hydroxide showing a definitely alkaline reaction in aqueous medium and a water soluble phosphate, and the production of cholinphosphates of metals (such as cobalt) to which corresponds a hydroxide which is not alkaline in aqueous medium, by means of a double decomposition from magnesium cholinphosphate or an alkali-earth, e.g. calcium, cholinphosphate and a salt of an acid which yields a water-insoluble magnesium or alkaline earth metal salt.

My invention also includes the salts of cholinphosphoric acid having a betain structure which may be produced by the process above described, more particularly the following salts (the formulas thereof being written according to the second form thereof):

(a) Magnesium cholinphosphate:

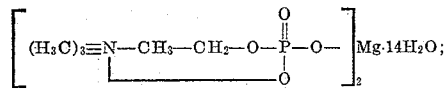

(b) Calcium cholinphosphate:

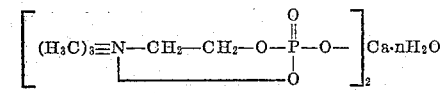

the symbol n corresponding to various degrees of hydration;

(c) Cobalt cholinphosphate:

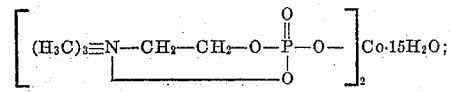

all of which can be isolated in crystalline form;

(d) Ferrous and ferric cholinphosphates

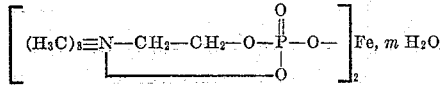

and

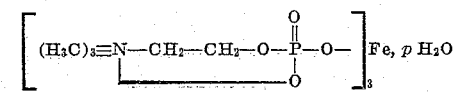

(where m and p denote various degrees of hydration); and the aqueous solutions thereof.

The above salts particularly the magnesium and cobalt salts and aqueous solutions thereof are valuable for therapeutics, the magnesium salt being useful by reason of the lipotropic activity thereof while the cobalt salt and iron salts are useful for the treatment of specific forms of anemia. They may be employed in mutual associations and also in association with cholinphosphate chlorides; for example the ferrous salt may be associated with the chloride of calcium choline phosphate.

Moreover by adding the calculated amount of sulphuric acid to an aqueous solution of say calcium or barium cholinphosphate and removing the precipitate, substantially pure cholinphosphoric acid having a betain structure may be produced in a more simple manner than proposed heretofore.

The magnesium salt of cholinphosphoric acid having a betain structure was found to have a lipotropic activity and a liver protecting activity superior to those of cholin and methionin. I believe that the activity of that magnesium salt is due chiefly to phosphorylcholin which is more active than cholin in the metabolism of lipids and is a direct intermediate in the biosynthesis of lecithin. Now magnesium cholinphosphate having a betain structure has a higher phosphorylcholin content than calcium cholinphosphate chloride which as far as I am aware is at this time the only compound out of that series employed for therapeutic purposes, the content being 94 percent in my salt (reckoned in anhydrous state) instead of 72 percent in the case of calcium cholinphosphate chloride (also reckoned in anhydrous state).

On the other hand I consider the magnesium ion to be more favorable than the calcium ion, particularly in various metabolic diseases, more especially in arteriosclerosis.

Finally my magnesium salt does not contain chlorine ion known to have an unfavorable action in water retaining phenomena bound with liver diseases (cirrhotic ascites).

For those reasons my magnesium salt is useful in hepatology and presumably in the treatment of arteriosclerosis.

A pharmaceutical form suitable for oral administration is aromatised granules containing 10 percent by weight of my magnesium salt. Suitable daily doses for oral administration range from 0.50 to 3 g.

For parenteral administration, aqueous solutions prepared in advance are not desirable because my magnesium cholinphosphate is subject to a hydrolysis in aqueous media which is fairly slow at ordinary temperatures but results in the production of a slight precipitate of magnesium phosphate. Consequently I prefer solutions in pharmaceutically acceptable anhydrous organic solvents, particularly triethylene glycol. As the production of a precipitate of magnesium phosphate is slow; it is also possible to deliver my magnesium salt in ampullas or small bottles for dissolution into physiological saline solution at the time of use; the solution may be given a slightly acid pH-value e.g. by means of citric acid or any other pharmaceutically acceptable acid, with a view to compensating for the alkalinity of my magnesium salt and thus to providing a substantially neutral solution for injection. In the parenteral administration of my magnesium salt in the form of solutions thereof as aforesaid, daily doses from 0.50 g. to 4 g., even higher doses, have been administered clinically for the treatment of liver diseases without causing toxic phenomena.

The cobalt salt of cholinphosphoric acid having a betain structure was found to cause a significant increase of the number of red blood corpuscles in young mice in the period of weaning, such action being still greater where the said salt is associated with an iron cholinphosphate, for example with ferrous cholinphosphate chlorite of the formula

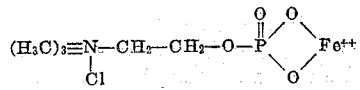

An effective hematopoiesis-stimulating medicine in granular form for oral administration has the following formulation

| | G. |
|---|---|
| Calcium cholinphosphate chloride | 7 |
| Ferrous cholinphosphate chloride | 1.5 |
| Cobalt cholinphosphate | 0.40 |
| Citric acid | 2 |
| Sugar and perfume to make up | 100 |

The following examples which are not limiting will illustrate my invention.

*Example 1.*—A mixture of cholin chloride (1 kg.), 85 percent orthophosphoric acid (1 kg.) and phosphorus pentoxide (1 kg.) was maintained on a boiling water-bath under a pressure of 12 mm. of mercury for 5 hours. After that period the rate of esterification of cholin chloride amounted to 95 percent.

The crude phosphorylation product was diluted by means of enough water (15–20 litres) for an easy subsequent filtering and in about 2 hours magnesium oxide MgO (750–800 g.) was added gradually while stirring to the cold mixture so as to avoid any excess, heating, and stirring was proceeded with overnight.

After that period the pH-value of the liquor which should still be on the very slightly acid side was checked; the mixture was filtered to remove the magnesium phosphate precipitate which was washed copiously and repeatedly with cold water for recovering the magnesium cholinphosphate retained by the precipitate.

The various aqueous filtrates and washing waters were joined and magnesium oxide (15–20 g.) was added thereto by small portions while following the pH-value so as eventually to obtain a pink colour with phenolphthalein.

The liquor was left standing and filtered or centrifuged until a clear liquor was obtained, then strongly concentrated under a reduced pressure at a low temperature (40° C).

To the concentrated solution thus obtained ethanol (1 to 2 volumes) was added, causing crystallization of magnesium cholinphosphate at a low temperature.

Magnesium cholinphosphate having a betain structure, containing 14 mols of water and corresponding to the formula

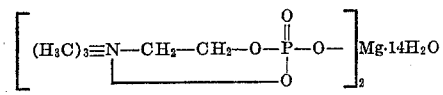

was dried and finally obtained with a yield of 85–90 percent, as colourless crystals grouped in clusters, which were very soluble in water and in methanol at ordinary temperature, fairly soluble in hot absolute ethanol but insoluble in acetone.

Analysis:

| Found | Calc. |
|---|---|
| P=9.6% | P=9.7% |
| N=4.37% | N=4.4% |
| Mg=3.73% | Mg=3.75% |
| H₂O=38% | H₂O=39% |
| Cl=nil | |

It should be noted that while it is preferred to add ethanol for an easier crystallization, such addition is not absolutely necessary for obtaining crystallized magnesium cholinphosphate, as said cholin phosphate is capable of forming very big crystals in a suitably cooled saturated aqueous solution.

The above compound containing 14 mols of water loses a portion of that water upon heating even to such moderate temperatures as 40–50° C., becoming hygroscopic and slowly recovering so much water as it lost. It was found to have a very high lipotropic activity shown by pharmacological experiments and corroborated by clinical study.

*Example 2.*—The same amount of cholin chloride (1 kg.) as in Example 1 was employed and it was phosphorylated in the same manner.

After diluting the crude phosphorylation product with the same amount of water, the product was brought under the same conditions to the same pH-value in the neighbourhood of neutrality by means of calcium hydroxide (1300–1350 g.). The precipitated calcium phosphate was filtered off, the filtrate alkalinized with a small amount of calcium hydroxide (15–20 g.) and the precipitated calcium phosphate washed and isolated as described in Example 1.

In this case, besides the desired calcium cholinphosphate, a variable amount of calcium cholinphosphate chloride was formed but being less soluble in water it crystallized spontaneously as soon as the solution was concentrated enough.

The filtrate and washing liquids were joined and concentrated, placed in a refrigerator then filtered for removing an amount of crystallized calcium cholinphosphate chloride.

To the filtrate acetone (twice the volume thereof) was added causing an oily layer to separate. The mixture was again placed in the refrigerator for removing the remainder of calcium cholinphosphate chloride which is insoluble in aqueous acetonic medium; an estimation of chlorine information as to the end of that crystallization.

The oily layer was separated, filtered and emulsified into an equal volume of 90–95 percent (by volume) ethyl alcohol. In the refrigerator, the emulsion again formed two layers, the upper alcoholic layer containing the whole amount of nonesterified, free cholin while the lower layer contained the desired calcium cholinphosphate. Left in the presence of atmospheric air the oily layer crystallized very slowly, yielding colourless, waxy crystals which it was difficult to isolate. The crystals were dried in vacuo over phosphorus pentoxide.

I thus obtained a compound showing various degrees of hydration according to the experiment; it corresponded to formula

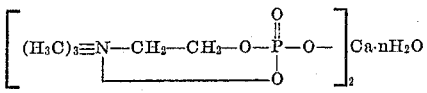

n being variable.

The compound was very soluble in water, methanol and absolute ethanol but insoluble in acetone.

*Example 3.*—To an aqueous solution (200 ml.) containing calcium cholinphosphate (100 g. reckoned as anhydrous salt), a concentrated aqueous solution of CoSO₄.7H₂O (69.5 g. in 150 ml. of distilled water) was added slowly.

The mixture was slightly warmed on a water-bath until incipient precipitation of CaSO₄. It was then left at room temperature for 12 hours.

The precipitated CaSO₄ was filtered off or centrifuged then washed with methanol until it became colourless.

The methanolic washing liquid was added to the main aqueous filtrate, in some cases causing separation of a further amount of CaSO₄. The mixture was again filtered after a rest period of 12 hours.

The filtrate was concentrated under a reduced pressure to remove methnoal. To the aqueous filtrate 95 percent (by volume) ethyl alcohol was added by the amount just necessary to cause the filtrate to become slightly turbid. The filtrate was placed in a refrigerator and upon incipient crystallization a further addition of ethanol was made to promote crystallization. The mother liquor then became substantially colourless.

Analysis:

| Found | Calculated |
|---|---|
| P=8.80% | P=8.94% |
| N=4.06% | N=4.04% |
| Co=8.55% | Co=8.51% |
| H₂O=39% | H₂O=39% |
| Cl=nil | |

The compound corresponded to the formula

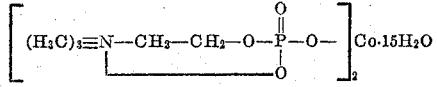

It was obtained as pink or blue crystals, very soluble in water, in methanol and in absolute ethanol. The colour change did not correspond to any significant loss of crystallization water.

*Example 4.*—To an aqueous solution (200 ml.) containing calcium cholinphosphate (100 g. reckoned as anhydrous salt) an equeous solution of ferric sulphate Fe₂(SO₄)₃ (33 g. in 300 ml. of distilled water) was added slowly.

The mixture was left for 12 hours at ambient temperature. The precipitated calcium sulphate produced therein was then separated by filtering or centrifuging then washed with methanol until it was substantially colourless.

The washing methanol liquor was then added to the main aqueous filtrate, the mixture left standing for 12 hours and filtered for removing a further amount of calcium sulphate precipitated by methanol, then concentrated under a reduced pressure for removing methanol therefrom. To the aqueous concentrate, three times the volume thereof of 95 percent ethanol was added, causing a red oil to be precipitated.

The oil was decanted and dried in vacuo over phosphorus pentoxide, yielding a dry, red, translucent varnish which peeled off into scales that could be powdered. The product was hygroscopic, very soluble in water, in methanol and in absolute ethanol.

It was obtained with various hydration degrees according to the cases and corresponded to the formula

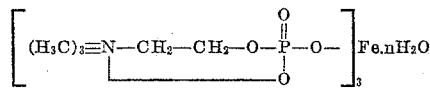

It should be understood that the foregoing examples are provided only for the sake of illustration and are not limiting, particularly as to the operation conditions and the reagents employed.

What I claim is:

Magnesium cholinphosphate of the formula

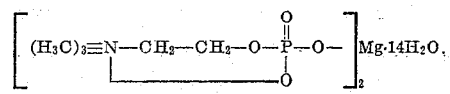

References Cited in the file of this patent

UNITED STATES PATENTS

| | | |
|---|---|---|
| 2,575,611 | Bandelin | Nov. 20, 1951 |
| 2,865,938 | Rosenfelder | Dec. 23, 1958 |

FOREIGN PATENTS

| | | |
|---|---|---|
| 684,977 | Great Britain | Dec. 31, 1952 |
| 1,092,965 | France | Apr. 28, 1955 |

OTHER REFERENCES

Baer: J. Am. Chem. Soc. 69, 1253–1254 (1947).
Myers et al.: J. Org. Chem. 22, 180–182 (1957).